United States Patent [19]

Fujii et al.

[11] Patent Number: 5,617,291
[45] Date of Patent: Apr. 1, 1997

[54] COMPACT MODEM SYSTEM SUITABLE FOR A NOTEBOOK OR OTHER SMALL COMPUTER

[75] Inventors: Kazuo Fujii, Yokohama; Yukifumi Nakazawa, Ebina; Takehiko Noguchi, Yokohama, all of Japan

[73] Assignee: International Business Machines Corporation, Armonk, N.Y.

[21] Appl. No.: 524,856

[22] Filed: Sep. 7, 1995

[30] Foreign Application Priority Data

Sep. 7, 1994 [JP] Japan .................................. 6-213509

[51] Int. Cl.⁶ ..................................................... H05K 7/10
[52] U.S. Cl. ........................... 361/686; 361/737; 375/222
[58] Field of Search ....................................... 361/684, 685, 361/686, 737, 728; 439/638, 928; 375/222; G06F 1/16

[56] References Cited

U.S. PATENT DOCUMENTS 5,457,601  10/1995  Georgopulos et al. ................. 361/686

*Primary Examiner*—Leo P. Picard
*Assistant Examiner*—Lynn D. Feild
*Attorney, Agent, or Firm*—Martin J. McKinley

[57] ABSTRACT

By the connection of a first subcard (26) to a main modem board (10), the modem system is customized to use an external data access arrangement (DAA) (32), while the connection of a second subcard (36) instead of the first customizes the modem system to use a built-in DAA (24). The subcards connect to the main modem board through a single interface connector (18). The first subcard includes a MiniDin connector (28) for connection to the external DAA, while the second subcard includes an RJ11 connector for direct connection to a telephone line. This mechanical arrangement results in a small, compact modem system suitable for use in a small computer.

1 Claim, 1 Drawing Sheet

COMPACT MODEM SYSTEM SUITABLE FOR A NOTEBOOK OR OTHER SMALL COMPUTER

BACKGROUND OF THE INVENTION

Applicants claim the foreign priority benefits under 35 U.S.C. 119 of Japanese Application No. 6-213509 filed Sep. 7, 1994. This Japanese Application and its translation are incorporated by reference into this Application. This invention pertains to modulator/demodulator or "modem" systems suitable connecting a computer or other data processing system to a telephone line or other communications network. More particularly, this invention pertains to a modem system that employs a novel mechanical interconnection of modem circuits to permit the manufacture of a physically small modem system suitable for a notebook or other small computer.

For a computer to be used to communicate across a public telephone network, an appropriate modem must be installed into the computer. Since the standards for data telephone exchange devices differ from country to country, a different data access arrangement circuit ("DAA") to connect the modem to a public telephone line must be installed each time the computer is used in a different country.

To eliminate such complexity, there is one proposal that involves the use of firmware that includes the standards for telephone data exchange devices for individual countries and that are written into a ROM. To standardize operation, the ROM is then included on an IC card that includes the modem (Japanese Unexamined Patent Publication No. 5-347647).

However, country specific information must be input to conform to the standards for telephone data exchange devices between countries. For example, when computers are used to communicate between one country and another that has different communication standards, country specific information has to be input for that country. Further, since the shape of modular jack connectors differs from country to country, modular jack connectors that match those for the respective countries are required.

Therefore, a modem board 50, as is shown in FIG. 3, has been proposed that employs a built-in DAA 24 to handle communications within Japan, the United States, etc., and a peripheral DAA 32 to handle communication in other countries that have different communication standards. The modem board 50 comprises an RJ11 connector 38 for the built-in DAA 24 and a MiniDin connector 28 for the peripheral DAA 32. A relay circuit 52 selects an analog signal received over analog lines 34 and 44, and couples the selected signal to a modem circuit 12 via a hybrid circuit 14.

However, it is difficult to physically fit the MiniDin connector 28, the RJ11 connector 38, and the relay circuit 52 on a small modem board suitable for a notebook computer. Therefore, it would be desirable to have a new and different mechanical arrangement of modem circuits, boards and connectors that would result in a compact modem system suitable for use in a notebook or other small computer, but still include a built-in DAA and the flexibility to connect to a peripheral DAA.

SUMMARY of the INVENTION

Briefly, the invention is modem board for coupling to a telephone line. The modem board is for use with a first subcard having an interface connector and a peripheral connector for connection to a peripheral data access arrangement ("DAA"). The modem board may also be used with a second subcard having an interface connector and a telephone line connector. The modem board includes a mating interface connector for connection to the interface connector of one of the subcards. The modem board also includes a modem circuit and a hybrid circuit having a first input/output ("I/O") connected to the mating interface connector, and a second I/O connected to the modem circuit. Also included is a built-in DAA having first and second I/O's connected to the mating interface connector. When the interface connector of the first subcard is connected to the mating interface connector of the modem board, the first I/O of the hybrid circuit is coupled to the peripheral connector of the first subcard. And when the interface connector of the second subcard is connected to the mating connector of the modem board, the first I/O of the built-in DAA is coupled to the telephone line connector, and the second I/O of the built-in DAA is coupled to the first I/O of the hybrid circuit.

DESCRIPTION of the ILLUSTRATIVE EMBODIMENTS

Figure 1:
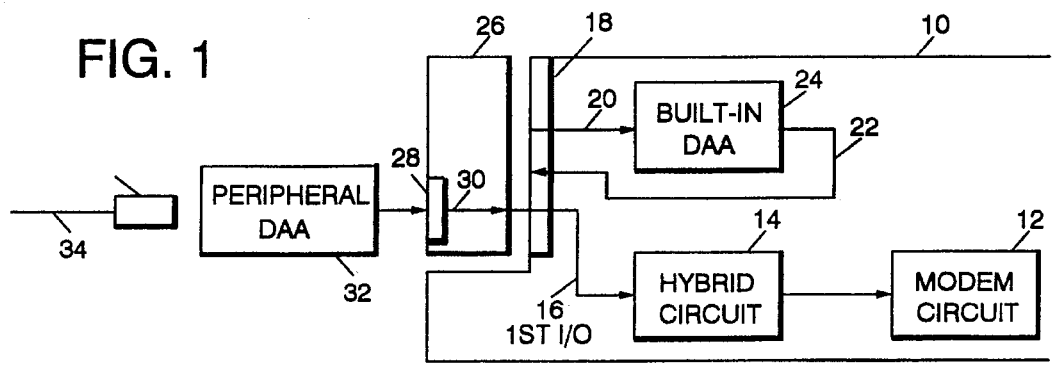
FIG. 1 is a block diagram of the modem system of the present invention illustrating a modem board and a subcard suitable for connection to a peripheral DAA.
Figure 2:
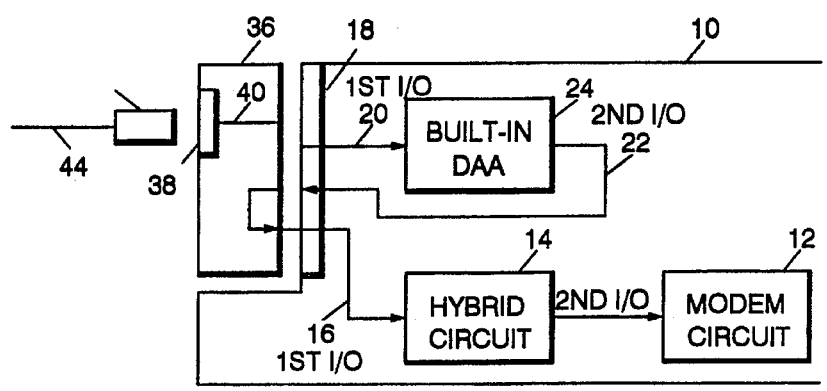
FIG. 2 is a block diagram similar to FIG. 1, except that the subcard of FIG. 1 has been replaced by a different subcard suitable for connecting a telephone line to the built-in DAA.
Figure 3:
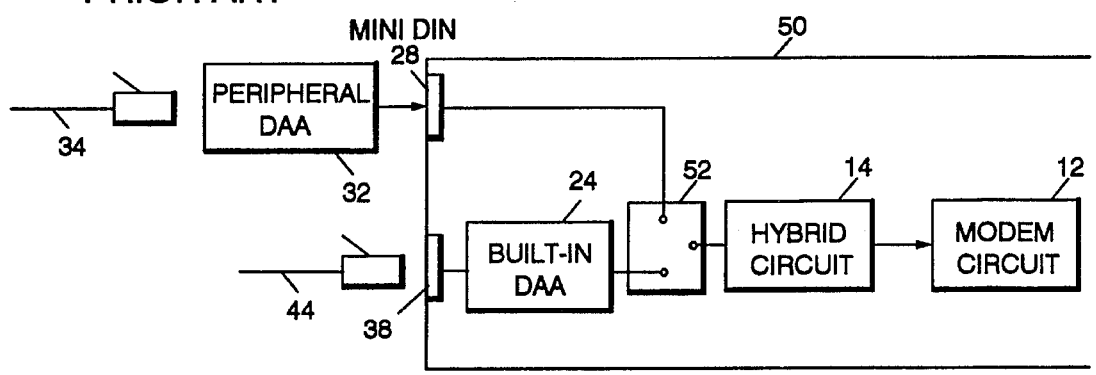
FIG. 3 is a block diagram illustrating a conventional modem system employing a built-in DAA. RJ11 telephone line connector, a MiniDin connector for connection to a peripheral DAA, and a relay to switch between the built-in and peripheral DAA's.

FIGS. 1 and 2 are block diagrams of a modem system of the present invention consisting of a modem board 10 and a subcard 26 or 36. A modem circuit 12, which is mounted on the modem board 10, converts an analog signal that is sent from a hybrid circuit 14 into a digital signal. The hybrid circuit 14, which performs a 2-line to 4-line conversion, is connected to an interface connector 18 by a signal line 16. The interface connector 18 is connected to a built-in DAA 24 by signal lines 20 and 22.

Referring to FIG. 1, a MiniDin connector 28 is provided on a subcard 26. When the subcard 26 is inserted into the interface connector 18 on the modem board 10, signal line 30 is connected to line 16, thus connecting the MiniDin connector 28 to the hybrid circuit 14. When the MiniDin connector 28 is connected to a peripheral DAA 32, the modem circuit 12 and the peripheral DAA 32 are coupled together via the subcard 26, making it possible to communicate over an analog line 34 that is connected to the peripheral DAA 32.

Referring to FIG. 2, an RJ11 connector 38 is provided on a subcard 36 having signal lines 40 and 42. When the subcard 36 is inserted into the interface connector 18 of the modem board 10 (instead of subcard 26, as illustrated in FIG. 1) the signal line 40 connects the RJ11 connector 38 to the signal line 20, while the signal line 42 connects the signal line 22 to the signal line 16. As a result, the built-in DAA 24 is connected to the modem circuit 12 via the subcard 36, making it possible to communicate over an analog line 44 that is connected to the built-in DAA 24 via subcard 36 and RJ11 connector 38.

As described above, since the subcards 26 and 36 are employed to provide jumper lines for switching signals, there is no need for the conventional installation of a relay circuit on the modem board, and the size of the modem board can be reduced. In addition, it is not necessary to provide either of the connectors, the RJ11 connector 38 or the MiniDin connector 28, on the modem board. Thus, using the structure described above, the selection of either a built-in DAA or a peripheral DAA is easily accomplished by the simple substitution of a different subcard. 26 or 36.

We claim:

1. A modem system for coupling to a telephone line, said modem system comprising a modem board, a first subcard having a modem board interface connector and a peripheral connector for connection to a peripheral data access arrangement ("DAA"), and a second subcard having a modem board interface connector and a telephone line connector, said modem board comprising:

a mating interface connector for connection to said modem board interface connector of one of said first and second subcards;

a modem circuit;

a hybrid circuit having a first input/output ("I/O") connected to said mating interface connector, and a second I/O connected to said modem circuit;

a built-in DAA having first and second I/O's connected to said mating interface connector;

wherein, when the interface connector of said first subcard is connected to said mating interface connector of said modem board, said first I/O of said hybrid circuit is coupled to said peripheral connector of said first subcard, and said first and second I/O's of said built-in DAA are not connected to said first subcard nor to said hybrid circuit; and wherein, when the interface connector of said second subcard is connected to said mating connector of said modem board, said first I/O of said built-in DAA is coupled to said telephone line connector, and said second I/O of said built-in DAA is coupled through said second subcard to said first I/O of said hybrid circuit.

* * * * *